(12) United States Patent
Mueller et al.

(10) Patent No.: US 11,876,758 B1
(45) Date of Patent: Jan. 16, 2024

(54) SYSTEMS AND METHODS FOR INTELLIGENTLY CONFIGURING AND DEPLOYING A CONVERSATIONAL MEMORY-INFORMED CONTROL STRUCTURE OF A MACHINE LEARNING-BASED DIALOGUE SYSTEM

(71) Applicant: Clinc, Inc., Ann Arbor, MI (US)

(72) Inventors: Matthew Mueller, Ann Arbor, MI (US); Connor Witt, Ann Arbor, MI (US); Jamal El-Mokadem, Farmington Hills, MI (US)

(73) Assignee: Clinc, Inc., Ann Arbor, MI (US)

( * ) Notice: Subject to any disclaimer, the term of this patent is extended or adjusted under 35 U.S.C. 154(b) by 0 days.

(21) Appl. No.: 18/369,496

(22) Filed: Sep. 18, 2023

Related U.S. Application Data

(60) Provisional application No. 63/407,245, filed on Sep. 16, 2022.

(51) Int. Cl.
*G06F 40/35* (2020.01)
*H04L 51/02* (2022.01)

(52) U.S. Cl.
CPC .............. *H04L 51/02* (2013.01); *G06F 40/35* (2020.01)

(58) Field of Classification Search
USPC ................................................ 704/7–10, 231
See application file for complete search history.

(56) References Cited

U.S. PATENT DOCUMENTS

| | | | | |
|---|---|---|---|---|
| 2016/0042735 | A1* | 2/2016 | Vibbert | G10L 15/1822 704/257 |
| 2020/0193265 | A1* | 6/2020 | Hill | G06N 3/045 |
| 2020/0286463 | A1* | 9/2020 | Galitsky | G06F 16/35 |
| 2021/0241066 | A1* | 8/2021 | Hill | G06F 18/22 |

\* cited by examiner

*Primary Examiner* — Leonard Saint-Cyr
(74) *Attorney, Agent, or Firm* — Padowithz Alce; Julian Getachew; Alce PLLC

(57) ABSTRACT

Systems and methods for configuring a dialogue guidance graph that governs a set of operations of an automated dialogue system and that includes encoding a recall operation to a target graphical node of the graph, wherein the recall operation causes: an accessing of a temporary data storage storing a log of data of an active dialogue session between a user and the automated dialogue system, an assessment of a terminality attribute associated with the target graphical node, a determination of whether the terminality attribute is disabled or enabled, wherein if the terminality attribute is disabled, the recall operation, causes the automated dialogue system to revert the active dialogue session to the target graphical node to perform one or more dialogue-based operations between the user and the automated dialogue system that converts the terminality attribute of the target graphical node from the disabled state to the enabled state.

18 Claims, 8 Drawing Sheets

200

Configuring an Automated Dialogue System Control Structure S210

Configuring one or more Memory-Action-Enabled Conversational Components S220

Implementing the Dialogue System Control Structure S230

Executing a Memory Action of a Memory-Action-Enabled Conversational Component S240

200

Configuring an Automated Dialogue System Control Structure S210

Configuring one or more Memory-Action-Enabled Conversational Components S220

Implementing the Dialogue System Control Structure S230

Executing a Memory Action of a Memory-Action-Enabled Conversational Component S240

FIGURE 2

Example State

```
State:           example_state
Competency:      example_comp
Slots:           {"bank_slot": "EXBank"}
```

- Crowdsource Data
- Personalities
- Slot Mapping
- Test Suites
- Global SVP Models
- Multi Intent
- Version Settings COMPETENCIES – [+New]

- agent_handover
- agent_goodbye
- clean_hello
- funds_transfer
- get_balance
- loan_information
- repeat_that
- report_error

Context Retention
Configure your AI Version and competencies to save context when transitioning between competencies and re-use the context when they come back to the same competency. Learn more in the Context Retention Documentation.

≡ Filter

| Competency | Enabled | Max. Conversation Turns | Max. Competencies Visited | Conversation Guidance Type | |
|---|---|---|---|---|---|
| All | ☐ | 50 | 5 | Default ▾ | Apply |
| agent_handover | ☐ | 50 | 5 | Default ▾ | |
| clean_goodbye | ☐ | 50 | 5 | Default ▾ | |
| clean_hello | ☐ | 50 | 5 | Default ▾ | |
| funds_transfer | ☑ | 50 | 7 | Incomplete Reminder ▾ | |
| get_balance | ☑ | 50 | 5 | Incomplete Reminder ▾ | |

< 1 2 >

Save Context Retention Settings

SYSTEMS AND METHODS FOR INTELLIGENTLY CONFIGURING AND DEPLOYING A CONVERSATIONAL MEMORY-INFORMED CONTROL STRUCTURE OF A MACHINE LEARNING-BASED DIALOGUE SYSTEM

CROSS-REFERENCE TO RELATED APPLICATIONS

This application claims the benefit of U.S. Provisional Patent Application No. 63/407,245, filed 16 Sep. 2022, and U.S. Provisional Patent Application No. 63/438,342, filed 11 Jan. 2023, which are incorporated in their entireties by this reference.

GOVERNMENT RIGHTS

The subject matter of the invention may be subject to U.S. Government Rights under National Science Foundation grants: NSF SBIR Phase 1 Grant—1622049 and NSF SBIR Phase 2 Grant—1738441.

TECHNICAL FIELD

The inventions herein relate generally to the machine learning and artificially intelligent dialogue systems fields, and more specifically to a new and useful system and method for configuring and deploying a memory-enabled dialogue system control structure of a machine learning-based dialogue service in the machine learning field.

BACKGROUND

Modern virtual assistants and/or online chatbots may typically be employed to perform various tasks or services based on an interaction with a user. Typically, a user interacting with a virtual assistant may pose a question or otherwise submit a command to the virtual assistant to which the virtual assistant may provide a response or a result. Many of these virtual assistants may be implemented using a rules-based approach, which typically requires coding or preprogramming many or hundreds of rules that may govern a manner in which the virtual assistant should operate to respond to a given query or command from a user.

While the rules-based approach for implementing a virtual assistant may be useful for addressing pointed or specific queries or commands made by a user, the rigid or finite nature of this approach severely limits a capability of a virtual assistant to address queries or commands from a user that exceed the scope of the finite realm of pointed and/or specific queries or commands that are addressable by the finite set of rules that drive the response operations of the virtual assistant.

That is, the modern virtual assistants implemented via a rules-based approach for categorizing user input and generating responses to users may not fully satisfy queries and commands posed by a user for which there are no predetermined rules to provide a meaningful response or result to the user.

Therefore, there is a need in the machine learning field and virtual dialogue service fields for systems and methods that enable intelligent techniques for categorizing unstructured data to structured categories of a machine learning-based dialogue service. The embodiments of the present application described herein provide technical solutions that address, at least, the need described above, as well as the deficiencies of the state of the art described throughout the present application.

BRIEF DESCRIPTION OF THE FIGURES

FIG. 2 illustrates an example method 200 in accordance with one or more embodiments of the present application;

FIG. 3 illustrates an example schematic of an example dialogue state in accordance with one or more embodiments of the present application;

FIG. 7 illustrates an example representation of a graphical user interface in accordance with one or more embodiments of the present application.

SUMMARY OF THE INVENTION(S)

Figure 1:
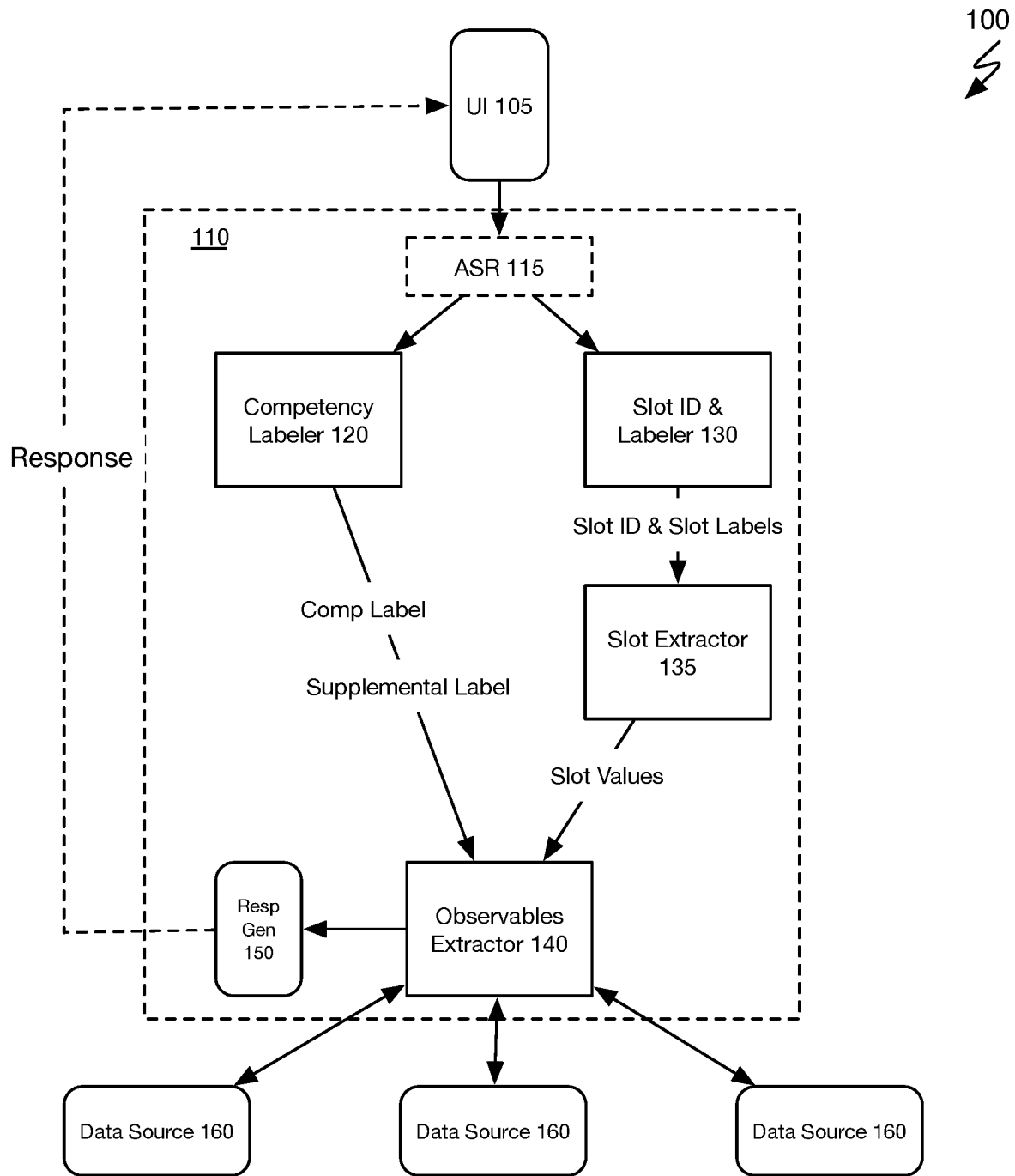
FIG. 1 illustrates a schematic representation of a system 100 in accordance with one or more embodiments of the present application.

In one embodiment, a computer-implemented method of enabling memory recall of an automated dialogue system includes configuring a graphical control structure that, when executed, controls an operation of an automated dialogue system, the dialogue guidance graph comprising a plurality of graphical nodes with pairs of the plurality of graphical nodes being connected by one or more of a plurality of graphical edges; programming, via a graphical user interface, a recall operation to a target graphical node of the plurality of graphical nodes, wherein the recall operation, when executed, causes: (i) an accessing of a cache memory storing a data log of an active dialogue session between a user and the automated dialogue system, (ii) a scan of the data log of the active dialogue session for one or more required parameter values of the target graphical node, and (iii) a determination of whether a null value exists for one or more required dialog parameter values for marking the target graphical node as satisfied based on the scan, wherein if the null value exists for the one or more required parameter values, the recall operation, when executed, further causes: (iv) the automated dialogue system to generate a prompt to the user based on a given required parameter value with the null value of the one or more required parameter values, wherein the prompt, when presented to the user, is for obtaining a valid parameter value to install in lieu of the null value; and executing, by one or more computers, the graphical control structure that enables a recall of the target dialogue node based on the programming of the recall operation.

In one embodiment, programming, via the graphical user interface, the recall operation to the target graphical node of the plurality of graphical nodes includes: enabling, via the graphical user interface, the recall operation of the target graphical node by setting a parameter value of the recall operation to one recall type of a plurality of distinct recall types.

In one embodiment, a first recall type of the plurality of recall types, when enabled, causes a reversionary transition within the graphical control structure that returns an active dialogue session from a current graphical node of the graphical control structure back to the target graphical node of the graphical control structure.

In one embodiment, a first recall type of the plurality of recall types, when enabled: allows an active dialogue session between the user and the automated dialogue system to diverge from the target graphical node to another graphical node of the graphical control structure while the target graphical node is in a non-terminal state, the non-terminal state relating to a state in which at least one of the one or more required parameter values of the target graphical node has the null value.

In one embodiment, a second recall type of the plurality of recall types, when enabled: disables an ability to transition an active dialogue session from the target graphical node to another graphical node of the graphical control structure; and causes one or more immediate reversions into the target graphical node until the null value attributed to the one or more required parameter values of the target graphical node is replaced with a valid parameter value.

In one embodiment, executing, by the one or more computers, the graphical control structure includes: during an active dialogue session between the user and the automated dialogue system, initializing the scan of the data log of the active dialogue session based on achieving a terminal state of a current graphical node of the graphical control structure, the terminal state relating to one or more required parameter values of the current graphical node without the null value.

In one embodiment, in response to the scan, identifying the null value of the one or more required parameter values of the target graphical node, causing, by the one or more computers, a reversionary transition within the graphical control structure that reverts the active dialogue session from the current graphical node of the graphical control structure back to the target graphical node of the graphical control structure.

In one embodiment, executing, by the one or more computers, the graphical control structure includes: during an active dialogue session between the user and the automated dialogue system, initializing the scan of the data log of the active dialogue session based on detecting an attempt by the user to diverge from the target graphical node.

In one embodiment, in response to the scan, identifying the null value of the one or more required parameter values of the target graphical node: disabling, by the one or more computers, an ability to transition the active dialogue session from the target graphical node to another graphical node of the graphical control structure; and causing, by the one or more computers, one or more immediate reversions into the target graphical node until the null value attributed to the one or more required parameter values of the target graphical node is replaced with a valid parameter value.

In one embodiment, a method includes configuring a dialogue guidance graph that, when executed, governs a set of operations of an automated dialogue system, the dialogue guidance graph comprising a plurality of graphical nodes with pairings of the plurality of graphical nodes being connected by one or more of a plurality of graphical edges; encoding, via a graphical user interface, a terminality-based recall operation to a target graphical node of the plurality of graphical nodes, wherein the terminality-based recall operation, when executed, causes: (i) an accessing of a temporary data storage storing a log of data of an active dialogue session between a user and the automated dialogue system, (ii) an assessment of a terminality attribute associated with the target graphical node within the log of data of the active dialogue session, (iii) a determination of whether the terminality attribute is an enabled state or in a disabled state for the target graphical node based on the assessment, wherein if the terminality attribute of the target graphical node is in a disabled state, the terminality-based recall operation, when executed, further causes the automated dialogue system to revert the active dialogue session to the target graphical node to perform one or more dialogue-based operations between the user and the automated dialogue system that converts the terminality attribute of the target graphical node from the disabled state to the enabled state; and executing, by one or more computers, the dialogue guidance graph that enables a recall of the target dialogue node based on the programming of the terminality-based recall operation.

In one embodiment, encoding, via the graphical user interface, the terminality-based recall operation to the target graphical node of the plurality of graphical nodes includes: enabling, via the graphical user interface, the terminality-based recall operation of the target graphical node by designating a parameter value of the terminality-based recall operation to one recall type of a plurality of distinct recall types.

In one embodiment, a first recall type of the plurality of recall types, when enabled, causes a reversionary movement within the dialogue guidance graph that returns the active dialogue session from a current graphical node of the dialogue guidance graph back to the target graphical node of the dialogue guidance graph.

In one embodiment, a first recall type of the plurality of recall types, when enabled: allows the active dialogue session between the user and the automated dialogue system to diverge from the target graphical node to another graphical node of the dialogue guidance graph while the target graphical node is in a non-terminal state, the non-terminal state relating to a state in which the terminality attribute is in the disabled state.

In one embodiment, a second recall type of the plurality of recall types, when enabled: disables an ability to move an active dialogue session from the target graphical node to another graphical node of the dialogue guidance graph; and causes one or more immediate reversions into the target graphical node until the terminality attribute of the target graphical node is enabled.

In one embodiment, executing, by the one or more computers, the dialogue guidance graph includes: during the active dialogue session between the user and the automated dialogue system, initializing the scan of the data log of the active dialogue session based on achieving a terminal state of a current graphical node of the dialogue guidance graph, the terminal state relating to a state in which the terminality attribute of the current graphical node is enabled.

In one embodiment, in response to the scan, identifying the terminality attribute of the target graphical node is in the disabled state, causing, by the one or more computers, a reversionary movement within the dialogue guidance graph that moves the active dialogue session from the current graphical node of the dialogue guidance graph back to the target graphical node of the dialogue guidance graph.

In one embodiment, executing, by the one or more computers, the dialogue guidance graph includes: during the active dialogue session between the user and the automated dialogue system, initializing the scan of the data log of the active dialogue session based on detecting an attempt by the user to diverge from the target graphical node.

In one embodiment, in response to the scan, identifying the terminality attribute of the target graphical node is in the disabled state: disabling, by the one or more computers, an ability to move the active dialogue session from the target graphical node to another graphical node of the dialogue guidance graph; and causing, by the one or more computers, one or more immediate reversions into the target graphical node until the disabled state of the terminality attribute is changed to the enabled state.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

1. System for a Machine Learning-Based Dialogue System

As shown in FIG. 1, a system 100 that automatically trains and/or configures machine learning models includes an artificial intelligence (AI) virtual assistant platform 110 (e.g., artificially intelligent dialogue platform), a machine learning configuration interface 120, a training/configuration data repository 130, a configuration data queue 135, and a plurality of external training/configuration data sources 140. Additionally, the system 100 may include an anomaly detection sub-system 170 that may function to receive training data samples as input and identify anomalous instances within the training data samples.

Figure 1A:
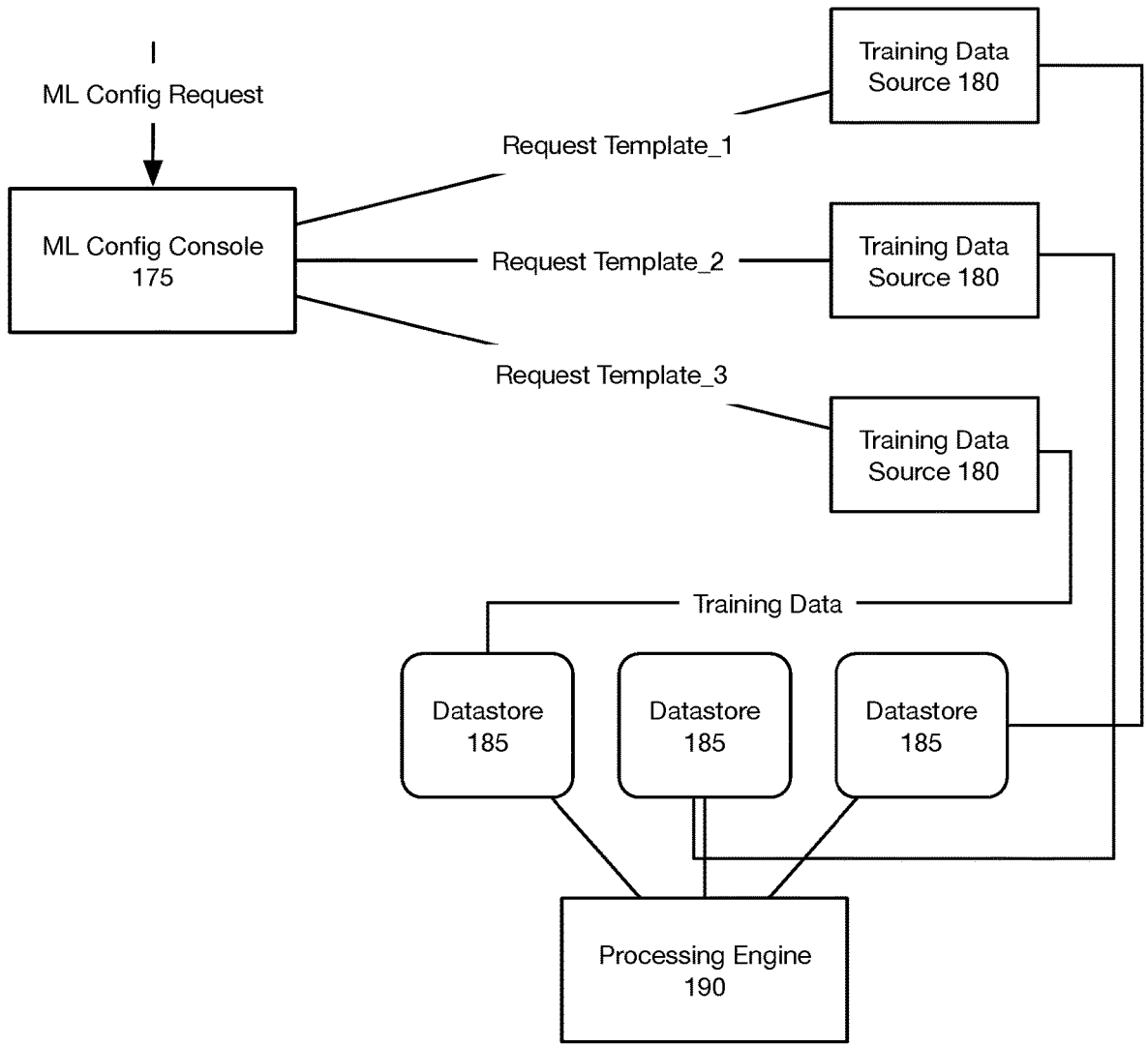
FIG. 1A illustrates a schematic representation of a sub-system of system 100 in accordance with one or more embodiments of the present application.

As shown in FIG. 1A, a subsystem 170 for intelligently training and/or configuring a machine learning model includes a machine learning model configuration and management console 175, a plurality of external training data sources 180, a plurality of datastores 185, and a training data processing engine 190.

The machine learning model configuration and management console 175 preferably functions to provide a user interface that may be in operable communication and/or configurational control of one or more components of the subsystem 170 as well as the artificially intelligent conversational system 100. The machine learning configuration and management console 175 preferably enables an administrator of a machine learning system or environment to perform configuration updates to one or more machine learning models of the machine learning system and/or configure new machine learning models into the machine learning system. The management console 175 may be implemented by one or more private or public (hardware) computing servers and/or computing servers of a distributed computing system (e.g., the cloud).

The plurality of external training data sources 180 preferably include several disparate sources of labeled training data that may be used for training machine learning models. For instance, the plurality of external training data sources 180 may include a crowdsourcing data platform, such as Amazon Mechanical Turk or the like, in which labeled data is sourced from a number of data sources or users into the crowdsourcing data platform.

The plurality of datastores 185 may function to collect and store machine learning training data from the plurality of external training data sources 180.

The training data processing engine 190 may function to process the raw training data samples collected from the plurality of external training data sources 18o into a refined or finished composition or list of training data samples that may be deployed into an operational or live machine learning model of the system 100.

Generally, the system 100 functions to implement the artificial intelligence virtual assistant platform 110 to enable intelligent and conversational responses by an artificially intelligent virtual assistant to a user query and/or user command input into the system 100, as described in U.S. patent application No. 15/797,414 and U.S. patent application No. 15/821,010, which are both incorporated herein in their entireties by this reference. Specifically, the system 100 functions to ingest user input in the form of text or speech into a user interface 160. At natural language processing components of the system 100 that may include, at least, the competency classification engine 120 the slot identification engine 130, and a slot value extractor 135, the system 100 functions to identify a competency classification label for the user input data and parse the user input data into comprehensible slots or segments that may, in turn, be converted into program-comprehensible and/or useable features. Leveraging the outputs of the natural language processing components of the system 100, the observables extractor 140 may function to generate handlers based on the outcomes of the natural language processing components and further, execute the generated handlers to thereby perform various operations that accesses one or more data sources relevant to the query or command and that also performs one or more operations (e.g., data filtering, data aggregation, and the like) to the data accessed from the one or more data sources.

The artificial intelligence virtual assistant platform 110 functions to implement an artificially intelligent virtual assistant capable of interacting and communicating with a user. The artificial intelligence platform no may be implemented via one or more specifically configured web or private computing servers (or a distributed computing system; e.g., the cloud) or any suitable system for implementing the system 100 and/or the method 200.

In some implementations, the artificial intelligence virtual assistant platform 110 may be a remote platform implemented over the web (e.g., using web servers) that is configured to interact with distinct and disparate service providers. In such implementation, an event such as a user attempting to access one or more services or data from one or more data sources of the service provider may trigger an implementation of the artificially intelligent virtual assistant of the AI platform 110. Thus, the AI virtual assistant platform 110 may work in conjunction with the service provider to attend to the one or more queries and/or commands of the users of the service provider. In this implementation, the data sources 160 may be data sources of the service provider that are external data sources to the AI virtual assistant platform 110.

The competency classification engine 120 together with the slot identification engine 130 and the slot value extractor 135 preferably function to define a natural language processing (NLP) component of the artificial intelligence platform 110. In one implementation, the natural language processing component may additionally include the automatic speech recognition unit 105.

The competency classification engine 120 functions to implement one or more competency classification machine learning models to label user input data comprising a user query or a user command. The one or more competency classification machine learning models may include one or more deep machine learning algorithms (e.g., a recurrent neural network, etc.) that have been specifically trained to identify and/or classify a competency label for utterance input and/or textual input. The training input used in training the one or more deep machine learning algorithms of the competency classification engine 120 may include crowd-sourced data obtained from one or more disparate user query or user command data sources and/or platforms (e.g., messaging platforms, etc.). However, it shall be noted that the system 100 may obtain training data from any suitable external data sources. The one or more deep machine learning algorithms may additionally be continually trained using user queries and user commands that were miss-predicted or incorrectly analyzed by the system 100 including the competency classification engine 120.

The competency classification engine 120 may additionally be configured to generate or identify one competency classification label for each user query and/or user command input into the engine 120. The competency classification engine 120 may be configured to identify or select from a plurality of predetermined competency classification labels (e.g., Income, Balance, Spending, Investment, Location, etc.). Each competency classification label available to the competency classification engine 120 may define a universe of competency-specific functions available to the system 100 or the artificially intelligent assistant for handling a user query or user command. That is, once a competency classification label is identified for a user query or user command, the system 100 may use the competency classification label to restrict one or more computer-executable operations (e.g., handlers) and/or filters that may be used by system components when generating a response to the user query or user command. The one or more computer-executable operations and/or filters associated with each of the plurality of competency classifications may be different and distinct and thus, may be used to process user queries and/or user commands differently as well as used to process user data (e.g., transaction data obtained from external data sources 160).

Additionally, the competency classification machine learning model 120 may function to implement a single deep machine learning algorithm that has been trained to identify multiple competency classification labels. Alternatively, the competency classification machine learning model 120 may function to implement an ensemble of deep machine learning algorithms in which each deep machine learning algorithm of the ensemble functions to identify a single competency classification label for user input data. For example, if the competency classification model 120 is capable of identifying three distinct competency classification labels, such as Income, Balance, and Spending, then the ensemble of deep machine learning algorithms may include three distinct deep machine learning algorithms that classify user input data as Income, Balance, and Spending, respectively. While each of the deep machine learning algorithms that define the ensemble may individually be configured to identify a specific competency classification label, the combination of deep machine learning algorithms may additionally be configured to work together to generate individual competency classification labels. For example, if the system receives user input data that is determined to be highly complex (e.g., based on a value or computation of the user input data exceeding a complexity threshold), the system 100 may function to selectively implement a subset (e.g., three machine learning algorithms from a total of nine machine learning algorithms or the like) of the ensemble of machine learning algorithms to generate a competency classification label.

Additionally, the competency classification engine 120 may be implemented by the one or more computing servers, computer processors, and the like of the artificial intelligence virtual assistance platform 110.

The slot identification engine 130 functions to implement one or more machine learning models to identify slots or meaningful segments of user queries or user commands and to assign a slot classification label for each identified slot. The one or more machine learning models implemented by the slot identification engine 130 may implement one or more trained deep machine learning algorithms (e.g., recurrent neural networks). The one or more deep machine learning algorithms of the slot identification engine 130 may be trained in any suitable manner including with sample data of user queries and user commands that have been slotted and assigned slot values and/or user system derived examples. Alternatively, the slot identification engine 130 may function to implement an ensemble of deep machine learning algorithms in which each deep machine learning algorithm of the ensemble functions to identify distinct slot labels or slot type labels for user input data. For example, slot identification engine 130 may be capable of identifying multiple distinct slot classification labels, such as Income, Account, and Date labels, then the ensemble of deep machine learning algorithms may include three distinct deep machine learning algorithms that function to classify segments or tokens of the user input data as Income, Account, and Date, respectively.

A slot, as referred to herein, generally relates to a defined segment of user input data (e.g., user query or user command) that may include one or more data elements (e.g., terms, values, characters, media, etc.). Accordingly, the slot identification engine 130 may function to decompose a query or command into defined, essential components that implicate meaningful information to be used when generating a response to the user query or command.

A slot label which may also be referred to herein as a slot classification label may be generated by the one or more slot classification deep machine learning models of the engine 130. A slot label, as referred to herein, generally relates to one of a plurality of slot labels that generally describes a slot (or the data elements within the slot) of a user query or user command. The slot label may define a universe or set of machine or program-comprehensible objects that may be generated for the data elements within an identified slot.

Like the competency classification engine 120, the slot identification engine 120 may implement a single deep machine learning algorithm or an ensemble of deep machine learning algorithms. Additionally, the slot identification engine 130 may be implemented by the one or more computing servers, computer processors, and the like of the artificial intelligence virtual assistance platform 110.

The machine learning models and/or the ensemble of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the artificially intelligent virtual assistant and/or other components of the system 100.

The slot value extraction unit 135 functions to generate slot values by extracting each identified slot and assigned slot label of the user query or user command and converting the data elements (i.e., slot data) within the slot to a machine or program-comprehensible object or instance (e.g., term or value); that is, the slot label is mapped to coding or data that a computer or program of the system 100 comprehends and is able to manipulate or execute processes on. Accordingly, using the slot label generated by the slot identification engine 130, the slot extraction unit 135 identifies a set or group of machine or program-comprehensible objects or instances that may be applied to slot data of a slot assigned with the slot label. Thus, the slot extraction unit 135 may convert the slot data of a slot to a machine or program-comprehensible object (e.g., slot values) based on the slot label and specifically, based on the available objects, instances, or values mapped to or made available under the slot label.

The observables extractor 140 functions to use the slot values comprising the one or more program-comprehensible objects generated at slot extraction unit 135 to determine or generate one or more handlers or subroutines for handling the data of or responding to the user query or user command of user input data. The observables extractor 140 may function to use the slot values provided by the slot extraction unit 135 to determine one or more data sources relevant to and for addressing the user query or the user command and determine one or more filters and functions or operations to apply to data accessed or collected from the one or more identified data sources. Thus, the coding or mapping of the slot data, performed by slot extraction unit 135, to program-comprehensible objects or values may be used to specifically identify the data sources and/or the one or more filters and operations for processing the data collected from the data sources.

The response generator 150 functions to use the competency classification label of the user input data to identify or select one predetermined response template or one of a plurality of predetermined response templates. For each competency classification label of the system 100, the system 100 may have stored a plurality of response templates that may be selected by the response generator 150 based on an identified competency classification label for user input data. Additionally, or alternatively, the response template may be selected based on both the competency classification label and one or more generated slot values. In such instances, the one or more slot values may function to narrow the pool of response templates selectable by the response generator to a subset of a larger pool of response templates to consider the variations in a query or user command identified in the slot values. The response templates may generally be a combination of predetermined output language or text and one or more input slots for interleaving the handler outputs determined by the observables extractor 140.

The user interface system 105 may include any type of device or combination of devices capable of receiving user input data and presenting a response to the user input data from the artificially intelligent virtual assistant. In some embodiments, the user interface system 105 receives user input data in the form of a verbal utterance and passes the utterance to the automatic speech recognition unit 115 to convert the utterance into text. The user interface system 105 may include, but are not limited to, mobile computing devices (e.g., mobile phones, tablets, etc.) having a client application of the system 100, desktop computers or laptops implementing a web browser, an automated teller machine, virtual and/or personal assistant devices (e.g., Alexa, Google Home, Cortana, Jarvis, etc.), chatbots or workbots, etc. An intelligent personal assistant device (e.g., Alexa, etc.) may be any type of device capable of touchless interaction with a user to performing one or more tasks or operations including providing data or information and/or controlling one or more other devices (e.g., computers, other user interfaces, etc.). Thus, an intelligent personal assistant may be used by a user to perform any portions of the methods described herein, including the steps and processes of method 200, described below. Additionally, a chatbot or a workbot may include any type of program (e.g., slack bot, etc.) implemented by one or more devices that may be used to interact with a user using any type of input method (e.g., verbally, textually, etc.). The chatbot or workbot may be embedded or otherwise placed in operable communication and/or control of a communication node and thus, capable of performing any process or task including, but not limited to, acquiring and providing information and performing one or more control operations.

2. Method for Configuring and Implementing a Memory-Enabled Automated Dialogue System As shown in FIG. 2, a method 200 for configuring and implementing a memory-enabled automated dialogue system control structure includes configuring an automated dialogue system control structure S210, configuring one or more memory-action-enabled conversational components of the dialogue system control structure S220, implementing the memory-enabled automated dialogue system control structure S230, and executing a memory action of a memory-action-enabled conversational component S240.

2.1 Configuring a Memory-Enabled Automated Dialogue System Control Structure S210, which includes configuring a memory-enabled automated dialogue system control structure, may function to configure or construct a memory-enabled automated dialogue system control structure for a machine learning-based automated dialogue system. A memory-enabled automated dialogue system control structure, as generally referred to herein, preferably relates to a graphical structure, such as a state-graph control structure, that may include conversational control components (conversational components) that may define and manage a conversation architecture with a machine learning-based virtual dialogue agent, which may in turn use dialogue memory logic and dialogue memory data, as well as user input and machine learning, to guide a conversation flow between the user and the virtual dialogue agent. In some embodiments, S210 may additionally function to implement a graphical user interface (GUI) for modifying and/or configuring the automated dialogue system control structure.

Control Structure: State Nodes

Preferably, the memory-enabled automated dialogue system control structure may include one or more dialogue state nodes (state nodes) as conversational components. In such embodiments, a state node may represent a dialogue state of a dialogue flow within the memory-enabled automated dialogue system control structure. In such embodiments, a dialogue state may be a logical component or a data structure (e.g., a data table) of the dialogue system control structure that enables storing one or more pieces of conversational data sourced or extracted from user input (e.g., user utterances or the like), dialogue system derived data, and/or data sourced from one or more machine learning model inferences. In one or more embodiments, a dialogue state may be graphically represented as an extensible dialogue data structure that may include a plurality of distinct entries including, but not limited to, a first entry for at least one dialogue competency (e.g., a competency subnetwork label, enumeration, or identifier), a second entry for at least one dialogue slot value, and/or a state label, enumeration, or identification, as shown by way of example in FIG. 3.

In some embodiments, each dialogue state node, when in operation, may relate to a distinct point or turn in a conversation or active dialogue between a user and the virtual dialogue assistant. In such embodiments, each dialogue state node may relate to one or more distinct responses generated for the virtual dialogue assistant by the automated dialogue system. In some embodiments, each dialogue state node may be associated with one or more utterance processing and/or response generating algorithms, heuristics, and/or the like including, but not limited to, one or more machine learning algorithms, models, or ensembles thereof, one or more logical algorithms (e.g., business logic algorithms), and/or any suitable algorithm, heuristic, or the like for processing user utterances, extracting slots from user utterances, and/or generating responses.

Control Structure: Transitions

In various embodiments, dialogue state nodes may preferably be linked by transitions or a similar logical dialogue *nexus* that may define and control the conversation flow from one state node to another in the memory-enabled automated dialogue system control structure. In various embodiments, the transitions or similar logical dialogue *nexus* may be represented by edges, links, and/or the like (e.g., graphical links or graphical edges in a state graph control structure). In one or more embodiments, a dialogue flow for performing some task or operation using a virtual dialogue agent may include a sequence of dialogue state nodes. In some such embodiments, parameters of entries of preceding dialogue state nodes within the sequence of state nodes should be satisfied (e.g., filled) to enable a transition to a subsequent dialogue state node within the sequence. In various embodiments, a transition may link two different state nodes within a dialogue flow or dialogue sequence. Additionally, and/or alternatively, in some embodiments, a transition may link a state node to itself (i.e., a state node may transition to itself, a reversionary transition, and/or the like).

Accordingly, in one or more embodiments, a memory-enabled automated dialogue system control structure may implement predefined memory action logic, heuristics, machine learning inferences, dialogue memory, and/or the like to automatically drive and govern transitions between dialogue state nodes. In some preferred embodiments, a transition type of a transition may determine how that transition governs movement between dialogue state nodes associated with that transition. In one or more embodiments, transition types may include, but are not limited to, classification transitions, slot transitions (sometimes referred to herein as "variable transitions" or "slot/variable transitions"), and-out-of-scope transitions.

A classification transition, as generally referred to herein, may preferably relate to a transition based on a classification of user utterance input (e.g., one or more user utterances). In some preferred embodiments, each user utterance may be classified (e.g., by a machine learning classifier) according to one or more intent labels, and each intent label may be associated with a particular or distinct intent of the user utterance. In some such embodiments, each classification transition may be associated with one or more intent labels. In such embodiments, a classification transition may govern a movement in an active dialogue from one associated state to another based on a comparison of intent labels of the classified user utterance to intent labels of the classification transition (e.g., the classification transition may instruct a movement from one state to another in the automated dialogue system control structure if a predicted or classified intent of a user utterance matches one or more intents associated with the classification transition). In one or more embodiments, S210 may function to configure one or more classification transitions in the automated dialogue system control structure, and S210 may additionally function to identify, select, add, remove, modify, and/or otherwise configure one or more associated intent labels for each classification transition.

A slot transition (or variable transition), as generally referred to herein, may preferably relate to a transition based on one or more slots extracted from user utterance input. In some embodiments, a slot transition may govern a movement in an active dialogue from one associated state to another once one or more required slots associated with the slot transition have been extracted or filled from user utterance input. In one or more embodiments, S210 may function to configure one or more slot transitions in the automated dialogue system control structure, and S210 may additionally function to identify, select, add, remove, modify, and/or otherwise configure one or more associated slots that must be extracted or filled for each slot transition.

A business logic transition, as generally referred to herein, may preferably relate to a transition that may be governed by or based on business logic (e.g., algorithms, heuristics, code, and/or the like). In some embodiments, a business logic transition may be based on business logic data or business logic programming code attempting an overriding transition to and/or from one or more states of the automated dialogue system control structure. In such instances of such embodiments, if a business logic transition matching the business logic override is present in the automated dialogue system control structure, the matching business logic transition may be executed. In one or more embodiments, S210 may function to configure one or more business logic transitions in the automated dialogue system control structure.

An out-of-scope transition, as generally referred to herein, may preferably relate to a transition that may be based on a determination of an out-of-scope input or user utterance. In some embodiments, a user utterance and/or user input may be classified or otherwise determined to be out-of-scope relative to a context of a current state in an active dialogue session and/or a current competency (e.g., competency subnetwork) of the active dialogue session. In some such embodiments, an out-of-scope transition may function to direct the active dialogue session to a particular state of the automated dialogue system control structure associated with the out-of-scope transition. In one or more embodiments, S210 may function to configure one or more out-of-state transitions in the automated dialogue system control structure.

Control Structure: Competency Subnetworks

In a preferred embodiment, the memory-enabled automated dialogue system control structure may include one or more competency subnetworks as conversational components. As referred to herein, a competency subnetwork may relate to a group of one or more topic or categorically-related dialogue state nodes that, when operated, may function to enable an automated conversation between a user and a virtual dialogue agent within the one or more topics or categories for which the dialogue state nodes may be programmed. In some preferred embodiments, a competency subnetwork may include state nodes capable of managing a particular competency, function, and/or conversational capability of the automated dialogue system. In some embodiments, the one or more related state nodes of a competency subnetwork may be linked to one another by graphical transitions or similar graphical *nexus* components. In one or more embodiments, each distinct competency subnetwork may include or be associated with a distinct competency subnetwork label, enumeration, identifier, or the like.

In some embodiments, S210 may function to configure each competency subnetwork with one or more associated slots. In such embodiments, the associated slots of the competency subnetwork may relate to data (e.g., values, text strings, etc.) to be extracted from user utterances when one or more nodes of the competency subnetwork is in operation. In such embodiments, the one or more associated slots of each competency subnetwork may relate to the particular function or conversational capability of the competency subnetwork.

Control Structure: Root Node

In a preferred embodiment, the memory-enabled automated dialogue system control structure may include one or more dialogue root nodes (root nodes) as conversational components. In one or more embodiments, a root node may function to guide the conversation flow of an active conversation or active dialogue to a specific competency subnetwork or other node. Accordingly, in such embodiments, the root node may classify user input data and/or user utterances based on a classification inference output from one or more machine learning models. Accordingly, in such embodiments, the root node may use the resulting classification inference to determine which dialogue state node or competency subnetwork the conversation flow should be directed toward (e.g., via classification transitions). Additionally, or alternatively, in some embodiments, the root node may function to transition or direct the conversation flow from one competency subnetwork to another competency subnetwork. In one or more embodiments, the root node may be connected to one or more competency subnetworks and/or one or more dialogue state nodes by one or more graphical transitions (e.g., classification transitions) or similar graphical *nexus* components.

State Graph User Interface

Figure 6:
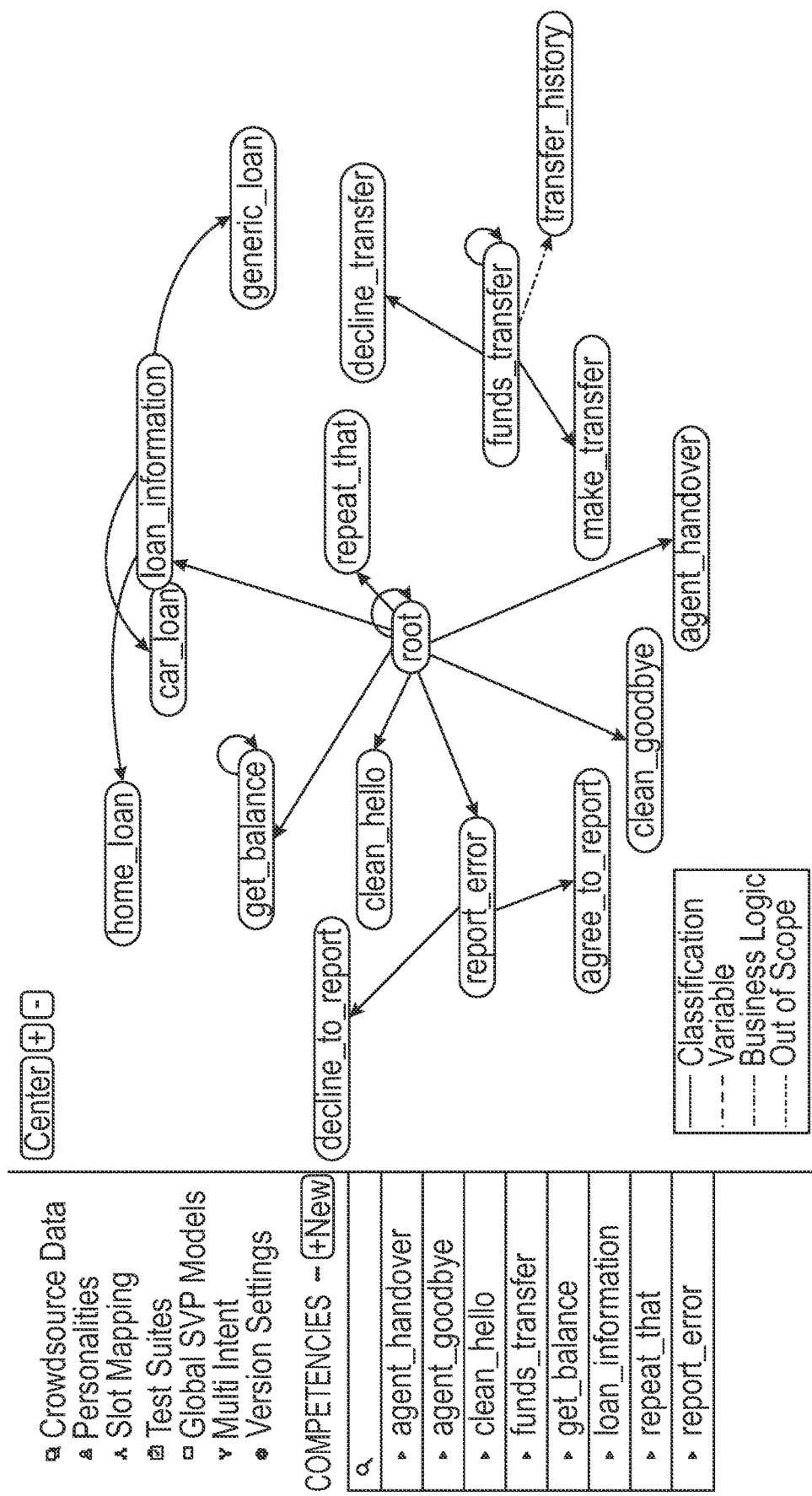
FIG. 6 illustrates an example representation of a graphical user interface in accordance with one or more embodiments of the present application.

Preferably, a dialogue state graph configuration graphical user interface (GUI) may be implemented to modify and/or configure the automated dialogue system control structure, as shown by way of example in FIGS. 6 and 7. For example, in some embodiments, the graphical user interface may be used to modify and/or configure the automated dialogue system by adding dialogue state and/or root nodes, modifying existing state and/or root nodes, removing state and/or root nodes, and adding and/or modifying transitions between state and/or root nodes. In various embodiments, the graphical user interface may be used (e.g., by a dialogue system control structure designer, platform user, or the like) to modify, add, and/or remove competency subnetworks of the automated dialogue system control structure. In some embodiments, dialogue state nodes may be added to or removed from a competency subnetwork by drag-and-drop manipulation. Additionally, and/or alternatively, in some embodiments, dialogue state nodes may be added to a competency subnetwork by selecting the competency and/or state node using a graphical selection control such as a drop-down list, radio button, checkbox, and/or the like. In one or more embodiments, the dialogue state nodes, dialogue root nodes, competency subnetworks, and transitions of the automated dialogue system control structure may be visual GUI objects represented by graphical state nodes, graphical root nodes, graphical competency subnetworks, and graphical transitions as graphical user interface objects in the graphical user interface.

2.2 Configuring Memory-Action-Enabled Components

S220, which includes configuring one or more memory-action-enabled conversational components of the automated dialogue system control structure, may function to configure one or more memory-action-enabled conversational components (memory components) by identifying or selecting one or more conversational components of the memory-enabled automated dialogue system control structure to be memory-action-enabled components. In one or more embodiments, the memory-action-enabled components may be enabled with one or more memory actions that, when executed, simulate an ability of a virtual dialogue agent to exhibit conversational memory (sometimes referred to herein as "context retention") in recalling one or more (incomplete or unfinished) dialogue states of a current session and/or historical dialogue sessions of a user and perform an action to enable a completion of a historical or active/current/pending dialogue session. In a variation, the configuring may include manipulating graphical user interface (GUI) objects into memory-action-enabled conversational components. In this variation, the manipulating of one or more GUI objects to enable a memory action may include, but should not be limited to, dragging and dropping a memory action GUI object from outside of a target graphical control structure into one or more sections of the graphical control structure to active a memory action capability of a component or dialogue state node of the graphical control structure. In various embodiments, the memory-action-enabled conversational components may include competency subnetworks, state nodes, or any other suitable component of the automated dialogue system control structure.

Configuring Memory Components: User Interface

In a preferred embodiment, one or more conversational components of the automated dialogue system control structure may be selected and/or identified to be memory-action-enabled by a user interface. In some embodiments the user interface may be the dialogue state graph configuration GUI, as shown by way of example in FIG. 7. Selecting and/or identifying the conversational components to be memory-action-enabled may include using one or more graphical selection controls in the graphical user interface. The graphical selection controls may be any suitable indicator such as a checkbox, a toggle, a radio button, a dropdown list, or the like.

In some preferred embodiments, configuring memory-action-enabled components may include identifying or selecting a memory action type and/or a memory action logic type (e.g., tentative traversal deficiency, non-traversal deficiency, and/or the like, as described in 2.4). In such embodiments, configuring the memory action type of a memory-action-enabled component may include selecting and/or identifying the memory action type for the memory-action-enabled component via a graphical selection control (e.g., a checkbox, a toggle, a radio button, a dropdown list, or the like). As a non-limiting example, a memory-action-enabled competency subnetwork may be configured with an incomplete reminder memory action type (as described in 2.4) by selection via a dropdown list graphical selection control, as shown by way of example in FIG. 7. It shall be noted that the above example is non-limiting, and any suitable graphical selection control may be used to identify or select a memory action type for any suitable memory-action-enabled component.

Additionally, in some embodiments, the dialogue state graph configuration GUI may be used to design and/or enable one or more of the conversational components of the control structure (for example, a competency subnetwork) with one or more memory actions that, when executed or triggered, automatically perform a dialogue-advancing action in an active dialogue between a user and a virtual dialogue agent based on dialogue memory. In some embodiments, a memory action may set dialogue state values according to predefined memory action logic. In various embodiments, the one or more memory actions may include, but should not be limited to, one or more different types of memory actions governed by a respective type of memory action logic.

As a non-limiting example, a memory action logic, such as a non-traversal deficiency with immediate reversion memory action may prevent an active dialogue from continuing or traversing to a new dialogue state or dialogue subnetwork by reverting the active dialogue to an immediately preceding state or current dialogue state in conversational flow based on meeting predefined memory action conditions and/or memory action logic.

As another non-limiting example, a memory action logic, such as a tentative traversal deficiency with posterior reversion memory action may allow the active dialogue to continue or traverse a dialogue control structure to a new dialogue state or dialogue subnetwork before reverting the active dialogue to a prior dialogue state in the dialogue flow based on meeting predefined memory action conditions and/or memory action logic. It shall be recognized that memory actions may be triggered by predefined memory action logic, conditions, rules, heuristics, machine learning model inferences, or any other suitable means or combination thereof for triggering an action.

Configuring Memory Components: Configuring Completion Metrics

Preferably, configuring one or more memory-action-enabled conversational components may include identifying one or more completion metrics or completion logic for each memory-action-enabled conversational component. As used herein, a completion metric may refer to a property of a conversational component, such as a state, a transition, or a state property or a transition property, which indicates completion of a memory-action-enabled component. As used herein, completion logic may refer to any logic, heuristic, condition, or rule which indicates a state of completion or incompletion of a memory-action-enabled component.

As a non-limiting example, a memory-action-enabled competency subnetwork may include one or more terminal dialogue state nodes (terminal nodes) as one or more completion metrics. In such an example, one or more dialogue state nodes of the memory-action-enabled competency may be identified or selected as terminal nodes via a graphical selection control in the dialogue state graph configuration GUI (e.g., a checkbox, a toggle, a radio button, a dropdown list, or the like). Additionally, or alternatively, in some embodiments S220 may function to automatically identify and/or select one or more (or all) dialogue state nodes of the memory-action-enabled competency subnetwork that do not have outgoing transitions (i.e., state nodes that do not transition an active dialogue to another dialogue state node) as terminal nodes. In such an example, the completion logic of the memory-action-enabled competency subnetwork may include requiring an active dialogue to reach or satisfy at least one terminal dialogue state node for the memory-action-enabled competency subnetwork to be evaluated as completed. In such an example, a dialogue flow for performing a given task or objective within a dialogue control structure may include multiple dialogue state nodes, which may be tethered together within an acyclic sequence or the like. Accordingly, in some embodiments, a completion logic or metric may require that each of the distinct dialogue states within the sequence be satisfied or completed.

In yet another embodiment, a completion metric or a completion logic may be based on a completion or satisfaction of a number of predetermined fields of a target dialogue state within a graphical control structure. That is, in one or more embodiments, a target dialogue state node may include a plurality of distinct fields in which data entries may be added and, in such embodiments, a completion metric or completion logic may be based on having or identifying one or more entries into the plurality of distinct fields of the target dialogue state node.

In one or more preferred embodiments, S220 may function to configure one or more competency subnetworks as the one or more memory-action-enabled conversational components. In some such embodiments, each memory-action-enabled competency subnetwork may be selected and/or otherwise identified via the dialogue state graph configuration GUI and/or any other suitable user interface, as shown by way of example in FIG. 7. Additionally, in some such embodiments, at least one completion metric may be identified for each memory-action-enabled competency subnetwork, whereby each identified completion metric may indicate if the corresponding memory-action-enabled competency subnetwork has been completed in a particular dialogue session. In some preferred embodiments, the completion metric may be one or more state nodes that may be identified as one or more terminal state nodes, such that each memory-action-enabled competency subnetwork may include one or more terminal state nodes. In some such embodiments, at least one of the one or more terminal state nodes must be activated or traversed in an active dialogue for that competency subnetwork to be evaluated as complete. In one or more embodiments, each terminal state node may be selected via the user interface via one or more graphical selection controls such as a drop-down list, radio button, checkbox, and/or the like.

Configuring Memory Components: Memory Action Limit Threshold

In some embodiments, S220 may additionally or alternatively function to configure one or more memory action limit thresholds or limit characteristics for one or more memory-action-enabled conversational components. As generally referred to herein, a memory action limit threshold or limit characteristic may relate to a value, property, or characteristic of a corresponding memory-action-enabled conversational component that may be evaluated to determine a limit or threshold beyond which the memory action of the corresponding memory-action-enabled conversational component may be disabled or may not be triggered or otherwise initiated.

As a first non-limiting example, a memory-action-enabled competency subnetwork may be configured with a memory action limit threshold that may include a number of conversational turns N, where N is greater than zero. In such an example, a memory action associated with the memory-action-enabled competency subnetwork may only be triggered if the number of conversational turns that have occurred since leaving the competency subnetwork in an active dialogue (e.g., turns in the conversation or active dialogue between a user and the virtual dialogue assistant) is below N. Additionally, in such an example, if the number of conversational turns since leaving the memory-action-enabled competency subnetwork in the active dialogue exceeds N, the associated memory action of the memory-action-enabled competency subnetwork may be disabled.

As a second non-limiting example, a first memory-action-enabled competency subnetwork may be configured with a memory action limit threshold that may include a number of competencies visited M, where M is greater than zero. In such an example, a memory action associated with the first memory-action-enabled competency subnetwork may only be triggered if the number of competency subnetworks visited or activated since leaving the first memory-action-enabled competency subnetwork in an active dialogue (e.g., competency subnetworks traversed in the active dialogue) is below M. Additionally, in such an example, if the number of competency subnetworks visited or activated since leaving the first memory-action-enabled competency subnetwork in the active dialogue exceeds M, the associated memory action of the first memory-action-enabled competency subnetwork may be disabled.

In one or more embodiments, memory action limit thresholds may include, but are not limited to, a maximum amount of conversation turns (e.g., a number of conversation turns that have occurred between a user and the virtual dialogue assistant since leaving a corresponding memory-action-enabled component in an active dialogue), a maximum amount of competency subnetworks visited (e.g., a number of competency subnetworks visited since leaving a corresponding memory-action-enabled component during traversal of the automated dialogue control system in an active dialogue session), a maximum amount of time elapsed (e.g., an amount of time elapsed since leaving a corresponding memory-action-enabled component during the active dialogue) and/or any other suitable threshold for limiting the initiation of a memory action. In one or more preferred embodiments, the memory action limit thresholds may be configured via the dialogue state graph configuration GUI and/or the like, as shown by way of example in FIG. 7. In such embodiments, the memory action limit thresholds may be directly input (e.g., via a text field or the like) and/or selected (e.g., via a graphical selection control such as a drop-down list, radio button, checkbox, and/or the like).

2.3 Implementing the Dialogue System Control Structure

S230, which includes implementing the dialogue system control structure, may function to implement the dialogue system control structure by traversing dialogue state nodes and conversational components of the automated dialogue system control structure in an active dialogue having one or more memory-action-enabled conversation components. Preferably, a machine learning-based automated dialogue system may implement the automated dialogue system control structure in an active dialogue between one or more users and a virtual (digital) dialogue agent enabled by the automated dialogue system. For instance, in one or more embodiments, one or more users may interface with the virtual dialogue assistant, and user input may cause the automated dialogue system to automatically traverse the nodes of the automated dialogue system control structure, perform one or more automated actions in response, and/or provide one or more responses or prompts to the one or more users. In various embodiments, traversing the nodes of the automated dialogues system control structure may guide the active dialogue based on predefined logic, heuristics, machine learning, dialogue memory, or any other suitable means or combination thereof.

Preferably, the active dialogue may be a dialogue or conversation between one or more users and a virtual dialogue assistant. In such embodiments, the virtual dialogue assistant may interact with and/or respond to the one or more users based on a current state of the active dialogue. In one or more embodiments, the current state of the active dialogue may be based on and directed by a computed state of the nodes, transitions, and competency subnetworks of the dialogue system control structure.

In one embodiment, a graphical user interface may display the active dialogue between one or more users and the virtual dialogue assistant. In some embodiments, the graphical user interface may display the conversation in a text format. In some embodiments, a user may use the graphical user interface to participate in the active dialogue by submitting input (e.g., text utterances) to the virtual dialogue assistant via a suitable language input means. Additionally, or alternatively, in some embodiments an audio user interface may be used to present the active dialogue to the one or more users. In some such embodiments, a user may use the audio user interface to participate in the active dialogue by submitting input (e.g., speech utterances) to the virtual dialogue assistant via any suitable language input means.

Dialogue Memory

Figure 4:
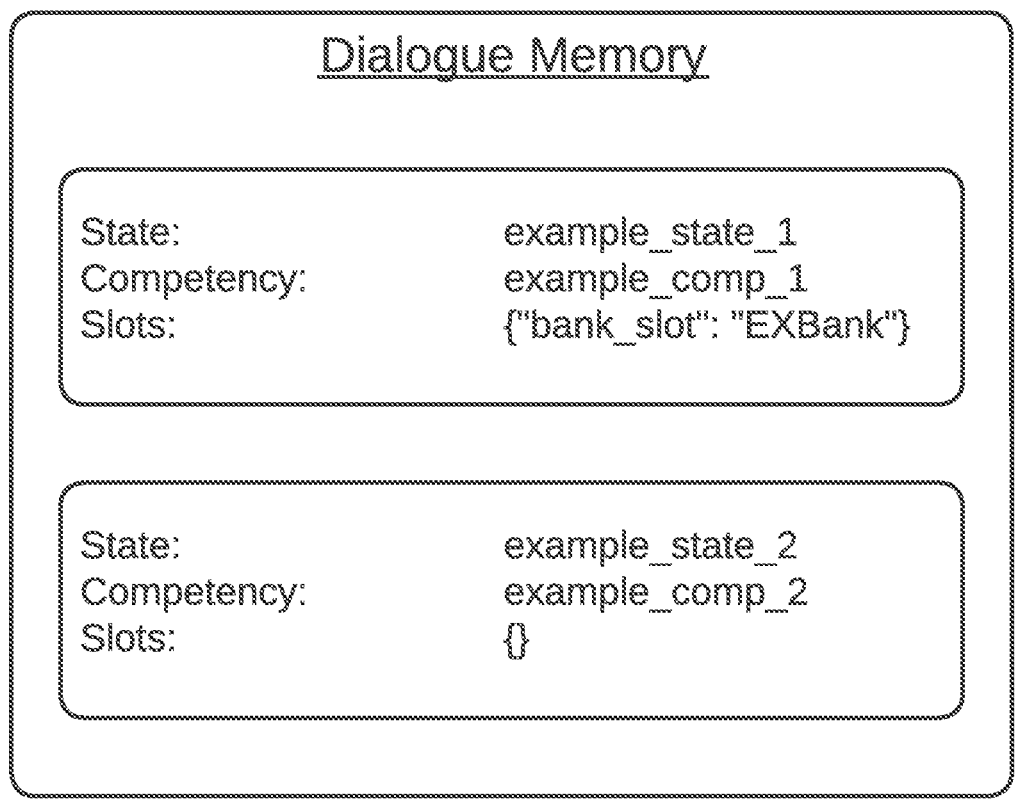
FIG. 4 illustrates an example schematic of a dialogue memory in accordance with one or more embodiments of the present application.

In some preferred embodiments, a dialogue memory of a computed state of an active dialogue may be stored or cached. In such embodiments, the dialogue memory may be a data structure for storing a history of utterances submitted by one or more users, a history of a traversal path of the active dialogue through the dialogue system control structure, a history of any or all slots or slot values extracted during the active dialogue, a history of active and/or previously-activated dialogue states (e.g., dialogue state enumerations, labels, identifiers, or the like), a history of active and/or previously activated competency subnetworks (e.g., competency subnetwork enumerations, labels, identifiers, or the like) a history of the values of properties of conversational components of the dialogue system control structure in the active dialogue. In a preferred embodiment, a state of a dialogue state node or other dialogue flow component having a memory action enabled of a target dialogue control structure may be specifically stored in a memory cache or similar temporary, quick-accessible storage medium. In such a preferred embodiment, in the case of a memory action-enabled dialogue state node, the entry fields together with the one or more values within the entry fields may be stored, a dialogue state completion indication (e.g., a binary indication or the like; e.g., completed/incomplete, true/false, 1/0, etc.) may be stored in cache, requirements for completing the dialogue state node (e.g., e.g., data fields of a node requiring values to establish a completed state), and/or any suitable data or value for enabling the memory action may be stored in cache memory. As shown by way of a non-limiting example in FIG. 4, the dialogue memory may include a history of dialogue states and the properties of those states. In various embodiments, the dialogue memory may be stored in a memory cache, or any other suitable storage means.

Traversal: Memory-Action-Enabled Component

In an embodiment, a current state of the active dialogue may enter, activate, or operate a memory-action-enabled conversational component. That is, in such an embodiment, the active dialogue between one or more users and the virtual dialogue assistant may traverse the conversational components of the memory-enabled automated dialogue system control structure and arrive at a memory-action-enabled conversational component. As a non-limiting example, a user may input a query that may be received by the virtual dialogue assistant, which then may use logic in a root node of the dialogue system control structure to direct the conversation to a memory-action-enabled competency subnetwork (i.e., a memory-action-enabled conversational component). In such embodiments, the method 200 may function to evaluate whether requirements or memory action logic associated with a target dialogue component having an associated memory action that is enabled have been satisfied or not satisfied based on inputs from a user participating in a conversation with a virtual dialogue agent.

2.4 Executing a Memory Action of a Memory-Action-Enabled Component

Figure 5:
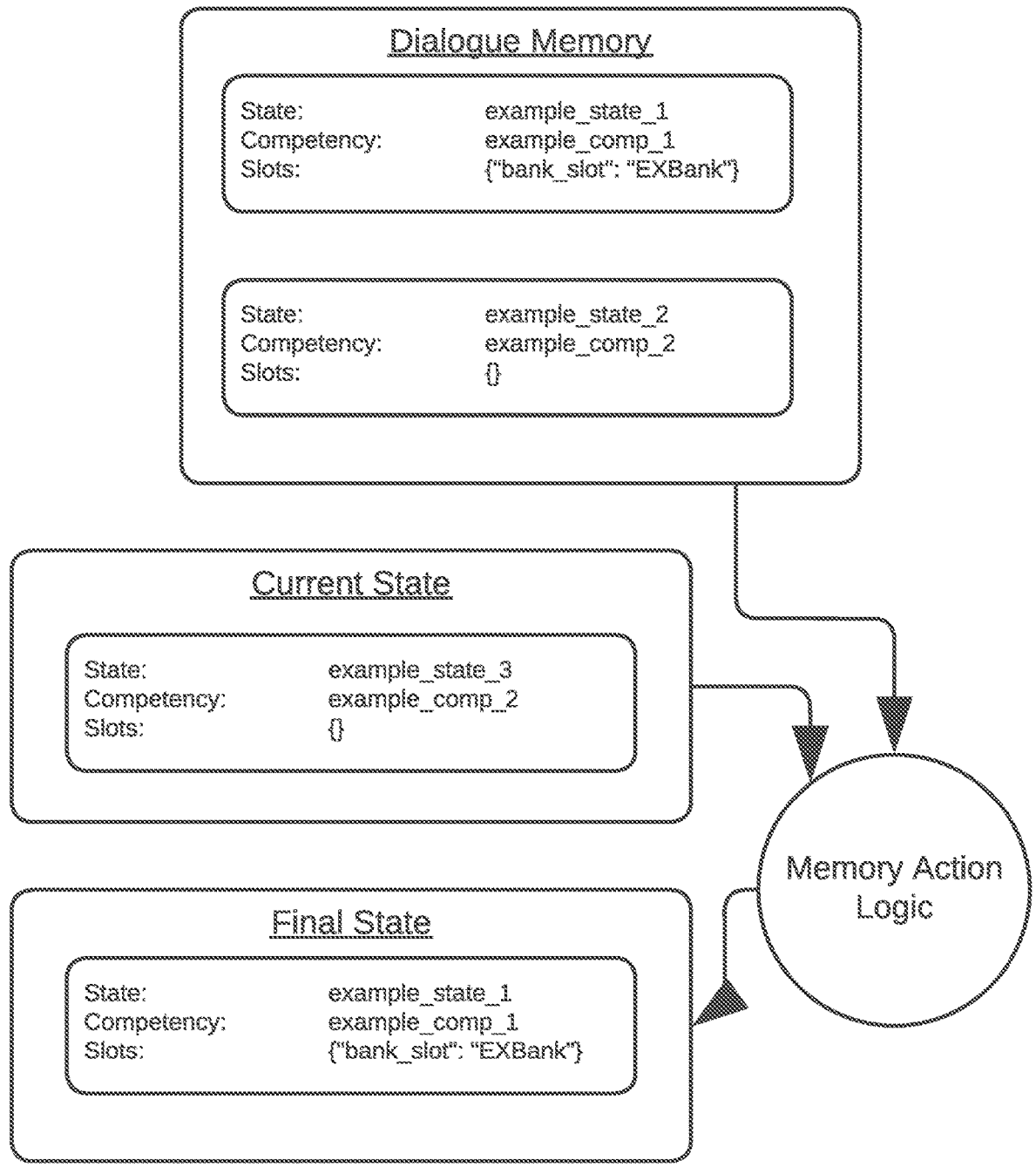
FIG. 5 illustrates an example schematic for implementing portions of the method 200 in accordance with one or more embodiments of the present application.

S240, which includes executing a memory action of a memory-action-enabled conversational component, may function to execute a memory action of a memory-action-enabled conversational component based on a satisfaction of predefined memory action logic or heuristics. In one or more embodiments, the memory action may be triggered or automatically executed based on evaluating a current state and/or the dialogue memory of the active dialogue and the completion metrics and/or completion logic of the current memory-action-enabled conversational component. Preferably, the memory action may function to set dialogue state values from dialogue memory according to memory action logic, as shown by way of example in FIG. 5.

In a preferred embodiment, the automated dialogue system may attempt to transition a current state of an active dialogue out of/away from a memory-action-enabled conversational component. In such an embodiment, this attempt may be the result of a response to user input in the active dialogue. In such an embodiment, the attempt may result in the automated dialogue system determining whether the memory-action-enabled conversational component has been completed by evaluating the current state of a conversation component (e.g., a target dialogue state node) of the automated dialogue system and dialogue memory (e.g., memory cache associated with the target dialogue state node) with the completion logic and/or completion metrics of the memory-action-enabled conversational component. In such an embodiment, if the memory-action-enabled conversational component has not been completed, a memory action associated with the conversational component may be identified and executed (e.g., a prompt to complete missing data in a data field or limiting further dialogue advancement beyond a current memory-enabled conversational component or the like).

As a non-limiting example, a user may input a query, utterance, or request in in active dialogue performed with the automated dialogue system while the current state of the active dialogue may be in a first memory-action-enabled competency or dialogue state node which requires the current state of the memory-action-enabled competency or dialogue state node to reach or achieve a state of completion before transitioning the active dialogue to another dialogue state node or dialogue competency subnetwork. In such an example, the automated dialogue system may scan or otherwise check a dialogue memory (e.g., cache memory) or the like to identify the completion logic and/or completion metrics of the first memory-action-enabled component(s) to determine whether the requirements of a memory-action enabled component of a current competency subnetwork has been completed. In such an example, if the requirements of the component of the current competency subnetwork have not been completed, a memory action associated with the competency may be identified and executed.

2.4.1 Memory Action: Non-Traversal Deficiency with Immediate Reversion

In one or more embodiments, a memory action may include a non-traversal deficiency with immediate reversion memory action (sometimes referred to herein as a "must-complete resume" or "must-complete reminder" memory action). In such an implementation, if S240 identifies a non-traversal deficiency with immediate reversion memory action, S240 may function to immediately revert the current active dialogue state to the immediately preceding active dialogue state, and/or cause a non-traversal of a current dialogue state by looping back into the current dialogue state until the completion logic and/or completion metrics of the memory-action-enabled conversational component are satisfied.

In some embodiments, S240 may function to identify a non-traversal deficiency with immediate reversion memory action during an active dialogue by first identifying an attempt by a user to the like to transition the current state of the active dialogue out of/away from a first memory-action-enabled conversational component, where the first memory-action-enabled conversational component may be enabled with a non-traversal deficiency with immediate reversion memory action. In such embodiments, this attempt to transition may be a response of the automated dialogue system to user input in the active dialogue (e.g., a user query or utterance that attempts to direct the active dialogue to a new or different topic). In such embodiments, S240 may scan the dialogue memory to evaluate the completion logic and/or completion metrics of the first memory-action-enabled conversational component to determine whether the one or more completion requirements associated with the memory action type of the first conversational component have been completed (e.g., if a terminal state node of the first conversational component has been reached in the active dialogue). In such embodiments, if S240 determines the conversational component has not been satisfied or may be deficient, S240 may function to identify the first conversational component as incomplete (i.e., an incomplete operation of the first conversational component), which may automatically execute the memory action thereby preventing the active dialogue from transitioning away from the incomplete first conversational component. Alternatively, S240 may function to store the current state of the active dialogue in the dialogue memory and immediately revert the current state of the active dialogue to the stored state in response to the attempt to transition; that is, S240 may store the incomplete state then loop back to that incomplete state.

As a non-limiting example, the completion logic of a first memory-action-enabled competency subnetwork with a non-traversal deficiency with immediate reversion memory action may require the active dialogue to reach at least one terminal state node in the first competency subnetwork. In some embodiments, a terminal state for a given node may be defined as satisfactorily providing one or more values into one or more fields of a given conversational component (e.g., a dialogue state node). In such an example, if user input directs the automated dialogue system to attempt to divert the active dialogue to a different competency subnetwork or different dialogue state node before reaching a terminal state node, the automated dialogue system may instead revert the current active dialogue state to the dialogue state immediately preceding the user input, thus preventing the active dialogue from leaving the first memory-action-enabled competency subnetwork before a terminal state node has been reached.

Preferably, the automated dialogue system may prompt the one or more users in the active dialogue to satisfy the completion logic and/or completion metrics of the current memory-action-enabled conversational component. In some embodiments, the prompt may function to inform the one or more users of the requirements to satisfy the completion logic and/or the completion metrics. Additionally, and/or alternatively, in some embodiments, user input may be required to satisfy the completion logic and/or completion metrics of the memory-action-enabled conversational component, and the prompt may request user input needed to satisfy the completion logic and/or completion metrics of the current memory-action-enabled conversational component. That is, in some embodiments, a content of the prompt for satisfying the completion metrics or completion logic of a target incomplete conversational component may be informed by or based on the one or more requirements of the completion logic or completion metrics that may not be satisfied. In this way, S240 may function to generate content of the prompt to cause the user to specifically provide input for addressing the deficiency or missing requirement(s).

2.4.2 Memory Action: Tentative Traversal Deficiency with Posterior Reversion In one or more embodiments, a memory action may include a tentative traversal deficiency with posterior reversion memory action (sometimes referred to herein as an "incomplete resume" or "incomplete reminder" memory action). In such an implementation, if S240 identifies a tentative traversal deficiency with posterior reversion memory action, S240 may function to compute and store a current state of a user-engaged conversational component (e.g., a dialogue state node, one or more dialogue state values, one or more user utterances, one or more competency subnetwork identifiers, and/or the like) that may be incomplete in an active dialogue and tentatively continue traversal of the automated dialogue system, until a pause and/or completion and/or abandonment of the active dialogue, at which point the automated dialogue system may revert the active dialogue state to the conversational component that may be incomplete in an attempt to prompt or encourage the user to complete the one or more requirements of the conversational component.

In some embodiments, S240 may function to identify a tentative traversal deficiency with posterior reversion memory action during an active dialogue by first identifying an attempt to transition the current state of the active dialogue out of/away from a first memory-action-enabled conversational component to a second conversational component, where the first memory-action-enabled conversational component may be enabled with a tentative traversal deficiency with posterior reversion memory action. In such embodiments, this attempt to transition may be a response of the automated dialogue system to user input in the active dialogue (e.g., a user query or utterance that attempts to direct the active dialogue to a new or different topic). In such embodiments, S240 may then function to evaluate the completion logic and/or completion metrics of the first conversational component to determine if the first conversational component has been completed and/or whether the one or more requirements of the first conversational component have been satisfied by user inputs or the like. In such embodiments, if S240 determines that the conversational component has not been completed/may be deficient, S240 may function to store or cache the current state of the active dialogue in memory as a stored incomplete dialogue state in the dialogue memory. In such embodiments, S240 may then allow the attempted transition by tentatively transitioning the current state of the active dialogue out of/away from the current memory-action-enabled conversational component to the second conversational component. In such embodiments, the automated dialogue system may continue to tentatively traverse the second conversational component, and/or one or more other conversational components, until the automated dialogue system identifies a pause and/or completion and/or abandonment of the active dialogue (e.g., a reversionary condition or trigger), at which point the automated dialogue system may revert the current active dialogue state to the stored dialogue state (i.e., incomplete dialogue state).

As generally referred to herein, tentative traversal may relate to the active dialogue traversing the conversational components of the automated dialogue system control structure after transitioning away from the memory-action-enabled conversational component and before reverting the active dialogue to the stored dialogue state. Accordingly, in some embodiments, the tentative traversal may be defined as an automated dialogue system action to advance an active dialogue by delaying a completion of a memory action-enabled dialogue state in which the delay or traversal may be defined as a period between a movement away from the incomplete dialogue state and a satisfaction of a reversionary condition.

As a non-limiting example, a first competency subnetwork enabled with a tentative traversal deficiency with posterior reversion memory action may include completion logic that may require the active dialogue to reach at least one terminal state node in the first competency subnetwork. In such an example, a current state of an active dialogue between a user and a virtual assistant may be in the first competency subnetwork, and the automated dialogue system may attempt to transition the active dialogue to a second competency subnetwork before a terminal state node of the first competency subnetwork has been reached (as an example, the automated dialogue system may attempt a transition upon the user requesting to divert the current active dialogue to another topic managed by another competency subnetwork). In such an example, the automated dialogue system may evaluate the completion logic of the first competency subnetwork as deficient/incomplete (i.e., an incomplete operation of the first competency subnetwork) since a terminal state node has not been reached. In such an example, the automated dialogue system may then store the current (incomplete) state of the active dialogue (e.g., the current state in the first competency) in the dialogue memory (e.g., cache). In such an example, the automated dialogue system may then tentatively transition the current state of the active dialogue to the second competency subnetwork and allow the active dialogue to continue to traverse the dialogue state nodes in the second competency subnetwork. In such an example, upon identifying a pause, completion, and/or abandonment in the active dialogue satisfying a reversionary condition (as an example, the active dialogue reaches a terminal state node of the second competency subnetwork), the S240 may function to scan the dialogue memory for any incomplete memory-action-enabled components. In such an example, S240 may function to identify the incomplete first competency based on the stored incomplete state of the first competency, and in turn S240 may function to revert the active dialogue to the stored dialogue state in the first competency.

In some embodiments, the second conversational component and/or other conversational components traversed during the tentative traversal may also be memory-action-enabled conversational components. In some embodiments, the second conversational component and/or other conversational components may be different conversational components; additionally, or alternatively, in some embodiments, the second conversational component and/or other conversational components may be other instances of the same conversational component as the first conversational component. As a non-limiting example, the first memory-action-enabled conversational component may be a first instance of a first competency subnetwork, and the second conversational component may be a second instance of the first competency subnetwork.

In one or more embodiments, S240 may identify a satisfaction of a reversionary condition or trigger, such as a pause, completion, and/or abandonment of the active dialogue, before initiating an execution of a memory action that may revert the current active dialogue state to the stored dialogue state. In some embodiments, identifying a pause in the active dialogue may include detecting a lack of user input in the active dialogue for a predetermined amount of time, such that a reversionary condition or trigger may be based on a timespan of lack of user input. In some embodiments, identifying completion of the active dialogue may include evaluating completion metrics and/or completion logic of the current conversational component being tentatively traversed by the active dialogue, such that a reversionary condition or trigger may be based on completion of a conversational component during tentative traversal (e.g., completion of a terminal state of a competency subnetwork during tentative traversal). In some embodiments, identifying abandonment of the active dialogue may include identifying a user attempting to exit and/or end the current active dialogue, such that a reversionary condition or trigger may be based on user input attempting to exit or end the current active dialogue. It shall be noted that S240 may function to use any suitable combination of types of reversionary conditions or triggers that may initiate an execution of a memory action that may revert a current state of the active dialogue to a stored state of the active dialogue.

Preferably, when S240 identifies a satisfaction of a reversionary condition or trigger in the active dialogue, S240 may function to scan the dialogue memory for one or more incomplete memory-action-enabled component stored states. In such embodiments, upon identifying an incomplete memory-action-enabled component stored state, the automated dialogue system may prompt the one or more users in the active dialogue to satisfy the completion logic and/or completion metrics of the incomplete memory-action-enabled conversational component of the stored state. In such embodiments, the prompt may function to inform the one or more users of the requirements to satisfy the completion logic and/or the completion metrics. Additionally, and/or alternatively, in some embodiments, user input may be required to satisfy the completion logic and/or completion metrics of the memory-action-enabled conversational component, and the prompt may request user input needed to satisfy the completion logic and/or completion metrics of the current memory-action-enabled conversational component. That is, in some embodiments, a content of the prompt for satisfying the completion metrics or completion logic of a target incomplete conversational component may be informed by or based on the one or more requirements of the completion logic or completion metrics that may not be satisfied. In this way, S240 may function to generate content of the prompt to cause the user to specifically provide input for addressing the deficiency or missing requirement(s).

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions.

The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method of enabling memory recall of an automated dialogue system, the method comprising:
    configuring a graphical control structure that, when executed, controls an operation of an automated dialogue system, the dialogue guidance graph comprising a plurality of graphical nodes with pairs of the plurality of graphical nodes being connected by one or more of a plurality of graphical edges;
    programming, via a graphical user interface, a recall operation to a target graphical node of the plurality of graphical nodes, wherein the recall operation, when executed, causes:
        (i) an accessing of a cache memory storing a data log of an active dialogue session between a user and the automated dialogue system,
        (ii) a scan of the data log of the active dialogue session for one or more required parameter values of the target graphical node, and
        (iii) a determination of whether a null value exists for one or more required dialog parameter values for marking the target graphical node as satisfied based on the scan,
    wherein if the null value exists for the one or more required parameter values, the recall operation, when executed, further causes:
        (iv) the automated dialogue system to generate a prompt to the user based on a given required parameter value with the null value of the one or more required parameter values, wherein the prompt, when presented to the user, is for obtaining a valid parameter value to install in lieu of the null value; and
    executing, by one or more computers, the graphical control structure that enables a recall of the target dialogue node based on the programming of the recall operation.

2. The method according to claim 1, wherein programming, via the graphical user interface, the recall operation to the target graphical node of the plurality of graphical nodes includes:
    enabling, via the graphical user interface, the recall operation of the target graphical node by setting a parameter value of the recall operation to one recall type of a plurality of distinct recall types.

3. The method according to claim 2, wherein a first recall type of the plurality of recall types, when enabled, causes a reversionary transition within the graphical control structure that returns the active dialogue session from a current graphical node of the graphical control structure back to the target graphical node of the graphical control structure.

4. The method according to claim 2, wherein a first recall type of the plurality of recall types, when enabled:
    allows the active dialogue session between the user and the automated dialogue system to diverge from the target graphical node to another graphical node of the graphical control structure while the target graphical node is in a non-terminal state, the non-terminal state relating to a state in which at least one of the one or more required parameter values of the target graphical node has the null value.

5. The method according to claim 2, wherein a second recall type of the plurality of recall types, when enabled:
    disables an ability to transition the active dialogue session from the target graphical node to another graphical node of the graphical control structure; and
    causes one or more immediate reversions into the target graphical node until the null value attributed to the one or more required parameter values of the target graphical node is replaced with a valid parameter value.

6. The method according to claim 1, wherein
    executing, by the one or more computers, the graphical control structure includes:
        during the active dialogue session between the user and the automated dialogue system, initializing the scan of the data log of the active dialogue session based on achieving a terminal state of a current graphical node of the graphical control structure, the terminal state relating to one or more required parameter values of the current graphical node without the null value.

7. The method according to claim 6, wherein
    in response to the scan, identifying the null value of the one or more required parameter values of the target graphical node, causing, by the one or more computers, a reversionary transition within the graphical control structure that reverts the active dialogue session from the current graphical node of the graphical control structure back to the target graphical node of the graphical control structure.

8. The method according to claim 1, wherein
    executing, by the one or more computers, the graphical control structure includes:
        during the active dialogue session between the user and the automated dialogue system, initializing the scan of the data log of the active dialogue session based on detecting an attempt by the user to diverge from the target graphical node.

9. The method according to claim 8, wherein
    in response to the scan, identifying the null value of the one or more required parameter values of the target graphical node:
        disabling, by the one or more computers, an ability to transition the active dialogue session from the target graphical node to another graphical node of the graphical control structure; and
        causing, by the one or more computers, one or more immediate reversions into the target graphical node until the null value attributed to the one or more required parameter values of the target graphical node is replaced with a valid parameter value.

10. A computer-implemented method comprising:
configuring a dialogue guidance graph that, when executed, governs a set of operations of an automated dialogue system, the dialogue guidance graph comprising a plurality of graphical nodes with pairings of the plurality of graphical nodes being connected by one or more of a plurality of graphical edges;
encoding, via a graphical user interface, a terminality-based recall operation to a target graphical node of the plurality of graphical nodes, wherein the terminality-based recall operation, when executed, causes:
  (i) an accessing of a temporary data storage storing a log of data of an active dialogue session between a user and the automated dialogue system,
  (ii) an assessment of a terminality attribute associated with the target graphical node within the log of data of the active dialogue session,
  (iii) a determination of whether the terminality attribute is an enabled state or in a disabled state for the target graphical node based on the assessment,
  wherein if the terminality attribute of the target graphical node is in a disabled state, the terminality-based recall operation, when executed, further causes the automated dialogue system to revert the active dialogue session to the target graphical node to perform one or more dialogue-based operations between the user and the automated dialogue system that converts the terminality attribute of the target graphical node from the disabled state to the enabled state; and
executing, by one or more computers, the dialogue guidance graph that enables a recall of the target dialogue node based on the programming of the terminality-based recall operation.

11. The method according to claim 10, wherein encoding, via the graphical user interface, the terminality-based recall operation to the target graphical node of the plurality of graphical nodes includes:
enabling, via the graphical user interface, the terminality-based recall operation of the target graphical node by designating a parameter value of the terminality-based recall operation to one recall type of a plurality of distinct recall types.

12. The method according to claim 11, wherein a first recall type of the plurality of recall types, when enabled, causes a reversionary movement within the dialogue guidance graph that returns the active dialogue session from a current graphical node of the dialogue guidance graph back to the target graphical node of the dialogue guidance graph.

13. The method according to claim 11, wherein a first recall type of the plurality of recall types, when enabled:
allows the active dialogue session between the user and the automated dialogue system to diverge from the target graphical node to another graphical node of the dialogue guidance graph while the target graphical node is in a non-terminal state, the non-terminal state relating to a state in which the terminality attribute is in the disabled state.

14. The method according to claim 11, wherein a second recall type of the plurality of recall types, when enabled:
disables an ability to move the active dialogue session from the target graphical node to another graphical node of the dialogue guidance graph; and
causes one or more immediate reversions into the target graphical node until the terminality attribute of the target graphical node is enabled.

15. The method according to claim 10, wherein
executing, by the one or more computers, the dialogue guidance graph includes:
during the active dialogue session between the user and the automated dialogue system, initializing the scan of the data log of the active dialogue session based on achieving a terminal state of a current graphical node of the dialogue guidance graph, the terminal state relating to a state in which the terminality attribute of the current graphical node is enabled.

16. The method according to claim 15, wherein
in response to the scan, identifying the terminality attribute of the target graphical node is in the disabled state, causing, by the one or more computers, a reversionary movement within the dialogue guidance graph that moves the active dialogue session from the current graphical node of the dialogue guidance graph back to the target graphical node of the dialogue guidance graph.

17. The method according to claim 10, wherein
executing, by the one or more computers, the dialogue guidance graph includes:
during the active dialogue session between the user and the automated dialogue system, initializing the scan of the data log of the active dialogue session based on detecting an attempt by the user to diverge from the target graphical node.

18. The method according to claim 17, wherein
in response to the scan, identifying the terminality attribute of the target graphical node is in the disabled state:
disabling, by the one or more computers, an ability to move the active dialogue session from the target graphical node to another graphical node of the dialogue guidance graph; and
causing, by the one or more computers, one or more immediate reversions into the target graphical node until the disabled state of the terminality attribute is changed to the enabled state.

* * * * *